June 30, 1931.  A. G. BJORKLUND  1,812,031
COMPENSATING CONDYLE CORD
Filed Nov. 16, 1927   2 Sheets-Sheet 1
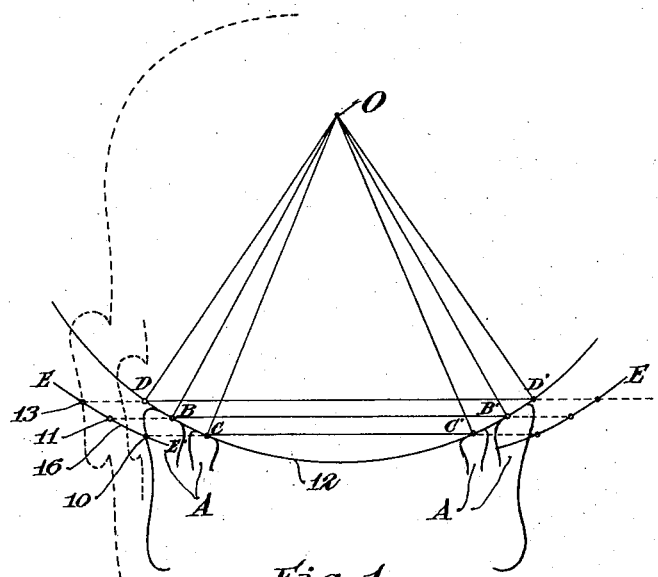
Fig. 1
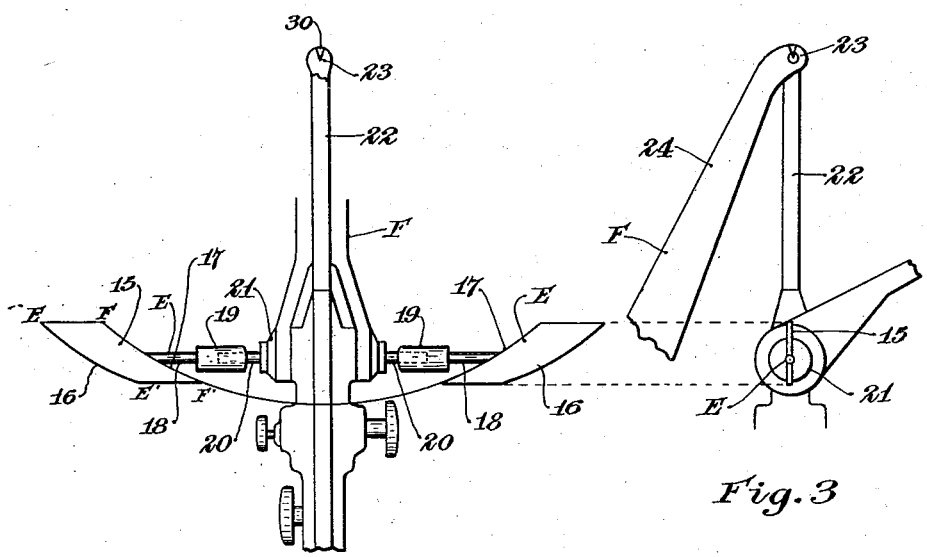
Fig. 2
Fig. 3
Inventor
Abner G. Bjorklund
By Horan Fischer
Attorney June 30, 1931.   A. G. BJORKLUND   1,812,031
COMPENSATING CONDYLE CORD
Filed Nov. 16, 1927   2 Sheets-Sheet 2

Inventor
Abner G. Bjorklund
By Horai Fiele
Attorney

Patented June 30, 1931

1,812,031

UNITED STATES PATENT OFFICE

ABNER G. BJORKLUND, OF ST. PAUL, MINNESOTA

COMPENSATING CONDYLE CORD

Application filed November 16, 1927. Serial No. 233,596.

My invention relates to a compensating condyle cord used in mounting casts of teeth in a dental articulator, the primary object of which is to provide means for locating the position of the cord passing through the condyles of a child or adult. It is apparent that as the child grows up to the normal adult, the distance between the condyle bones or the heads of the same as is figured in this method, changes in width so that it is a purpose of my invention to provide a means adapted to easily and accurately locate the proper position of the condyle, figuring from the center of a four inch radial sphere so that in using a dental articulator which is adapted to support oppositely disposed casts of the human teeth which are constructed so that the occluding and masticating movements of the human jaw can be simulated or approximated to a comparatively accurate degree in the teeth casts upon the articulator.

One of the methods in use, for example, of dental articulators such as my invention is particularly adapted to, is fully described in the patent to Monson, 1,457,385, dated June 5, 1923. My compensating condyle cords are adapted to be used with a dental articulator of the nature described in the patent mentioned above, and extend from an axis representing the condyle cord and is provided with an arcuated blade which permits the laying out of the proper position of the cords passing through the condyles of a child with a range to the normal adult in relation to the position to the center of the sphere which will be more fully hereinafter described. My compensating condyle cord also gives the relative position in relation to the condyle marking on the face of the patient for which the teeth are being made or set, so as to give the proper bite to the teeth. My compensating condyle cord also permits the indication of the relative position where condyles have widened on account of abrasion etc.

It is a primary feature of my invention to provide compensating condyle cords adaptable to the spherical method of the patent hereinbefore set forth and the apparatus designed to be used for dental articulators of this nature by a condyle cord making it more easy to locate the relative central position of the condyle in the different widths of jaws so that I have found my compensating condyle cord provides a very efficient means of accomplishing the results desired as I have learned in my general laboratory in the use of the same.

These objects together with other details and features of the invention will be more clearly and fully set forth in the specification and claims.

In the drawings forming part of this specification:

Figure 1 is a front posterior diagrammatic view showing different positions of cords passing through condyles from say a child to the normal adult, and also the relative position of the condyles where they have widened on account of abrasion.

Figure 1 is an enlarged diagrammatic front view of a portion of a dental articulator similar to that described in the above mentioned patent, showing my compensating condyle cords attached thereto in operation.

Figure 3 is a side view of a portion of a dental articulator showing the position of my compensating condyle cords in relation to the radial arm.

Figure 4:
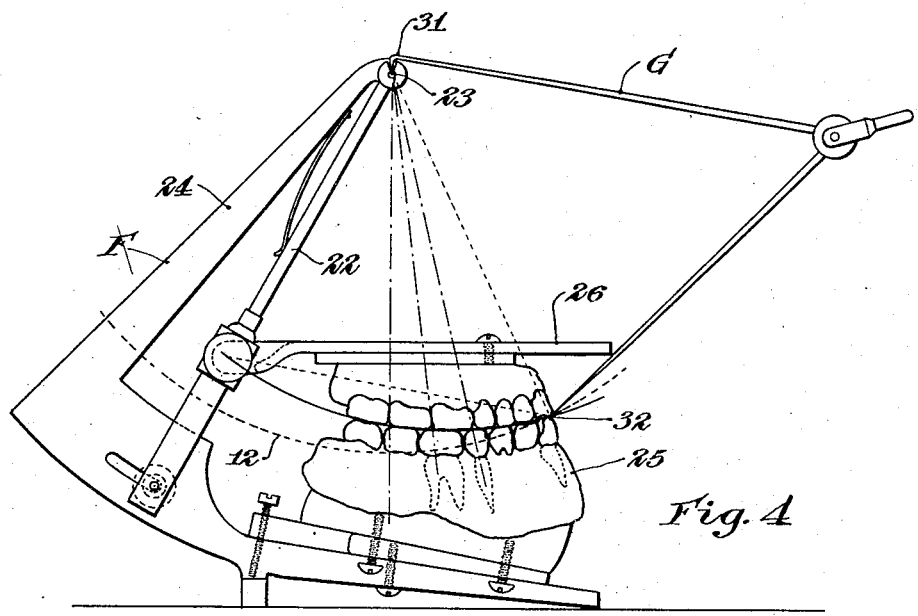
Figure 4 is a side view of a dental articulator adapted to carry my compensating condyle cord.
Figure 5:
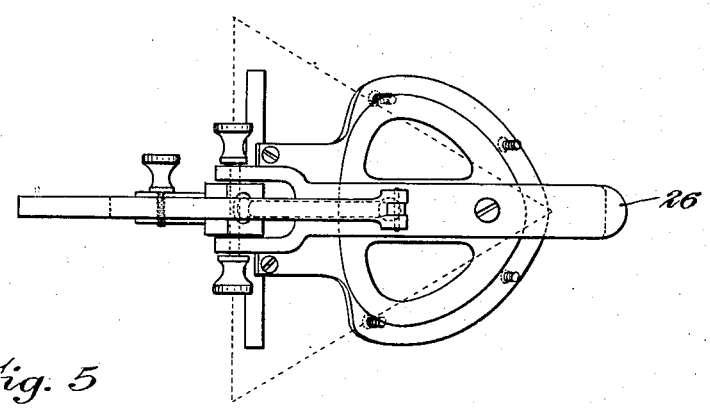
Figure 5 is a plan view of the same.

To more clearly describe and understand the purpose and function of my compensating condyle cord for dental articulators, I have illustrated diagrammatically in Figure 1 the posterior showing different positions of cords passing through condyles of a child, such as C to C' of the condyle bones A, and the normal adult B to B' of the condyle bones B in their relative position to the center or axis O of the arbitrary or imaginery sphere. I have also shown the relationship from the points C and B to the points 10 and 11 which are adapted to indicate the condyle marking on the face of the child and the normal adult, respectively.

I have also shown in this Figure 1 the cord D to D' to indicate the relative position where condyles have widened on account of abrasion. It will be noted that all of the points C, B and D are cut by the arc 12 formed by the arbitrary sphere adapted to indicate the occlusal surfaces of the teeth. Then the point 13 indicates condyle marking on the face for the cord D to D'.

This diagrammatic showing in Figure 1 will simplify the understanding of how I derived the style and shape of the plate 15 which is adapted to form the outer plate of my compensating condyle cord E.

The distance from the point C to 10, B to 10, or C to 11, B to 11, and D to 13, are all uniform in dimension which is not to exceed ¾ of an inch. I have found this to be the average distance from the marking on the face, a location ½ inch anterior to the center of the tragus of the ear taken in a line with the ala of the nose on the ordinary undeformed face of a person to the center of the working condyle. Thus the points 10, 11 and 13 describe an arc 16 of my plate 15 which is adapted to form the outer surface for use with a dental articulator in locating the condyle cord in mounting teeth with an articulator similar to that set forth in the patent mentioned above. The arc 16 is the same in Figure 1 and intersects the points 10, 11 and 13 as is illustrated in the outer arcuated edge 16 shown in Figure 2 of the plates 15. The inner arcuated edge 17 of the plate 15 of my compensating condyle cord E is the same described arc as 12 of Figure 1, which is formed by the arbitrary sphere described by the radius from the point O to any of the points C, B or D. Thus I provide the plate 15 having the two arcuated surfaces, the outer of which is 16 and the inner of which is 17 and which represent different calculations which I have found to be approximately accurate for the use of my compensating cord with articulators as herein described.

My compensating condyle cord E is provided with a rod-like shank 18 which supports the plate 15 and which is adapted to be engaged by the clutch 19 to support the same. The clutch 19 engages the rod 20 which fits in the axial opening of the member 21 of the articulator F more clearly illustrated in Figures 2 and 3. The drawings in Figures 2 and 3 illustrate only diagrammatically the position of the parts of the articulator. The articulator F is provided with a radial arm 22 which is pivoted at the point 23 to the arm 24 of the frame of the articulator F. The pivot point 23 of the radial arm 22 represents the axis of a four inch sphere which is employed in the method in the articulator described in the patent hereinbefore mentioned.

The plate 15 of my compensating condyle cord E is adapted to extend in line with the longitudinal center of the radial arm 22 so that the plate 15 is virtually parallel and in line with the radial arm 22 at all times in the use of the same.

The clutch 19 permits the proper adjustment of the condyle plate 15 and this adjustment is obtained by placing a compass at the point 23 and describing a four inch radius which is adapted to indicate the position of the arc 17 of the plate 15, so that if the inner arcuated edge 17 of the plate 15 is at a four inch radius from the axis 23 then the plate 15 is properly set and my condyle E is in correct position for use.

In making a transfer in the use of my compensating condyle cords E I first endeavor to locate the center of the condyle on the patient's face. I do this by asking the patient to open and close their mouth, keeping the little fingers in the external auditory canal to palpitate the movements of the same. Unless an unusual deformity is noticed the average location is ½ inch anterior to the center of the tragus of the ear taken in line with the ala of the nose. After the center of the condyle has been determined a marking to indicate the same is made on the face.

Then a transfer plate which is sandwiched in or between two wax bite patterns which are slightly warm is centered in the patient's mouth and the jaws brought in occlusion. This position is maintained. A pair of face bow rods adjustably secured to the transfer plate are then adjusted on the transfer plate until the ends of the same intersect markings of the condyle on the patient's face and the face bow rods are secured in this position so as to set the same, and it is removed in this adjusted position. This adjustment is then ready to be transferred to the dental articulator instrument.

When the lower cast is made in the ordinary and well known manner such as 25 illustrated in Figure 4, it is placed and fit to the occlusal markings of the transfer plate and carried to the instrument F. The cast is then trimmed and adjusted in the articulator F until the dividers set at four inches intersect the incisal edges of the anterior teeth. This gives the proper adjustment to the lower anterior teeth of the cast 25. The posterior of the cast is trimmed so that the ends of the face bow rods intersect the outside arc 16 of my compensating condyle cord equidistant from the ends EE of the same and the cast is then fastened in the articulator F. Then the upper cast may be placed in its respective position to the lower and fastened to the upper cast carrying plate 26.

This gives practically a perfect adjustment in a very simple and effective manner in the articulator F and my compensating condyle cords E have been so designed as to permit the dentist to make a much more easy adjustment than heretofore accomplished with articulators of this nature. I believe this is true because of the peculiar design of my compensating condyle cord which includes the plate 15 and which has been so designed with the outer arc 16 in relation to the inner arc 17 as to automatically cause the face bow rods to be readily set at a point to intersect this outside arc 16 equidistant from the ends of the same which brings the posterior of the cast in the proper position so that practically a perfect mounting can be readily and easily obtained.

The incisal surfaces of the anterior teeth are raised or lowered to conform with the four inch radius such as the distance from the axis O to the arc 12 which represents the arbitrary sphere from the point 23 to the dotted line 12 in Figure 4. Thus the lower cast is set in proper relation in the instrument F so the occlusal surfaces conform to the surface of the sphere as well as the condyles.

The axial opening into which the pin 20 of my compensating condyle cord E fits is adapted to represent the pivotal axis of the condyle bone A of a person's jaw so that this axial point wherein the condyle E fits represents the movement of the lower jaw of the individual. It is thus apparent that the importance of my invention in properly adjusting the anterior incisal edges, together with the posterior of the teeth in the cast 25 representing the lower set of teeth of the individual is extremely important, and while articulators have been used heretofore it has been difficult to set the cast within the same to locate the proper position of the condyles of a child which are, of course, different than the condyles of a normal adult, and then it is also true that the condyles change on account of abrasion of the teeth in the wear of the same so that I have provided the peculiar designed compensating condyle cords which virtually automatically permits the adjustment of the cast 25 to the proper position in the articulator instrument F so that the dental work may be placed into the person's mouth if it is made in accordance with the check obtained on the articulator F in using my compensating condyle E.

The dimensions for my condyle cord E may be readily stepped off or projected from the diagrammatic layout which I have illustrated in Figure 1, and which I have found to be the approximate average dimensions adaptable to the different patients in my practice in dentistry.

The instrument F illustrated in the drawings is shown merely for the purpose of illustrating a dental articulator of a nature adaptable to my condyle cord E and other similar instruments may be used equally well with my compensating condyle cords or my cords used with other instruments. The radial arm 22 of the instrument F has a recess 30 which extends to the axis 23 of the radial arm. This permits the dividers G to be provided with an inwardly curved end 31 on one side which fits into this recess 30 so that the other free end 32 of the dividers may be moved in position to intersect the occlusal edges of the teeth.

My compensating condyle cords perform an important function in the use of a dental articulator as it permits the cast to be so easily set in the articulator that the dentist may obtain a check of the setting of the casts in the instrument and then be practically assured of the proper adjustment of the dental work when placed in the patient's mouth. The plates 15 of my condyle cords E virtually raise or lower the center or axis of the condyle cord and in raising and lowering the same a wider or narrower adjustment is obtained. Thus if the patient is an adult wherein the condyles have widened on account of abrasion, then the setting will come up farther on either side of the plates 15 on the arcuated surfaces 16, representing possibly the setting such as D to 13, as illustrated in Figure 1, or the normal adult would come lower, say at the point B—11, and so on, the child's setting of the condyle would be lower yet owing to the narrower width of the condyle bones and would possibly be at C—10. Therefore it is apparent that my compensating condyle is adapted to automatically adjust the condyle centers in proper position on the arcuated edges 16 of the plates 15. It is therefore readily apparent that I accomplish an adjustment of the center of the condyle cord horizontally which takes in the width of the patient's condyles, and radially which takes in the shape of the patient's face and head.

In accordance with the patent statutes I have described the principles of operation of my compensating condyle cord and while I have illustrated a particular instrument to which my condyle cords are adaptable for use, I desire to have it understood that the illustrations are only suggestive of a means of carrying out my invention and that my compensating condyle cords may be used and applied with other instruments and may be varied in design and construction within the scope of the following claims without departing from the spirit of my invention.

I claim:

1. A compensating condyle cord including, a rod portion, and means on said rod adapted to indicate the point of marking of the condyle on a patient's face, said means being of a compensating nature to automatically locate the condyle axis in accordance with the actual condyles of a patient's jaws.

2. A compensating condyle cord for dental articulators including, an arcuated member having an arcuated outer edge adapted to represent an arc which may be intersected at various points to indicate the position of the condyle cord on a person's face.

3. A compensating condyle cord for dental articulators including, an adjustable rod member, a flat thin plate member having an outer and inner arcuated edge, said inner arcuated edge being adapted to conform to an approximate four inch radius, and said outer arcuated edge being adapted to conform to an arc described which at all points is horizontally equidistant from said inner arcuated edge.

4. A condyle cord for dental articulators including, a transfer plate, means associated with said transfer plate adjustable to indicate the axis of the condyles of a patient's jaw, and an arcuate means associated with a dental articulator to properly position the casts in the articulator when the set condyle axis indicating means intersects the arcuate means equidistant from the ends thereof.

5. A compensating condyle cord including, means for adjustably supporting the same to a dental articulator at a point representing the axis of a condyle of a normal human being, and plate means having an arcuated surface adapted to compensate for the widths of jaws in different human beings.

6. A condyle cord for dental articulators including, an inner arcuated surface adapted to indicate an arbitrary four inch radius sphere, adjustable means for setting said inner surface at a point equal to a four inch radius from a point on the articulator, and an outer arcuated surface on said condyle cord adapted to provide a compensating means to permit the proper setting of the face bow rods in the setting of a cast in an articulator.

7. A dental condyle cord having means for adjusting the position of the same to fixedly secure the cord to an articulator, and a gauge surface on said cord adapted to compensate for different width condyles of human beings.

8. A dental condyle cord comprising, an adjustable rod supporting member, an arcuated plate member supported on the end of said rod, and an outer arcuated edge adapted to permit the adjusting of face bow rods of the articulator to properly set the casts in the articulator to duplicate the action of the human jaws for dental purposes.

ABNER G. BJORKLUND.